United States Patent
Vronsky et al.

(10) Patent No.: US 8,317,479 B2
(45) Date of Patent: Nov. 27, 2012

(54) SEGMENTED ROTOR BLADE EXTENSION PORTION

(75) Inventors: Tomas Vronsky, Southampton (GB); Mark Hancock, Southampton (GB)

(73) Assignee: Vestas Wind Systems A/S, Aarhus N (DK)

( * ) Notice: Subject to any disclaimer, the term of this patent is extended or adjusted under 35 U.S.C. 154(b) by 1007 days.

(21) Appl. No.: 12/231,610

(22) Filed: Sep. 3, 2008

(65) Prior Publication Data
US 2010/0028161 A1  Feb. 4, 2010

(30) Foreign Application Priority Data
Aug. 1, 2008  (GB) .................................. 0814108.7

(51) Int. Cl.
*F01D 5/22* (2006.01)
(52) U.S. Cl. .................... 416/196 R; 416/196 A; 416/23
(58) Field of Classification Search .............. 416/196 R, 416/196 A, 23
See application file for complete search history.

(56) References Cited

U.S. PATENT DOCUMENTS

| | | | |
|---|---|---|---|
| 4,316,701 A | 2/1982 | Scarpati et al. | |
| 4,412,784 A | 11/1983 | Wackerle et al. | |
| 4,618,313 A | 10/1986 | Mosiewicz | |
| 4,732,542 A * | 3/1988 | Hahn et al. | 416/226 |
| 5,456,579 A | 10/1995 | Olson | |
| 7,204,674 B2 | 4/2007 | Wobben | |
| 7,798,780 B2 * | 9/2010 | Bakhuis et al. | 416/223 R |
| 2002/0105190 A1 | 8/2002 | Thomas | |
| 2003/0138290 A1 * | 7/2003 | Wobben | 403/293 |
| 2004/0105752 A1 | 6/2004 | Wobben | |
| 2007/0025858 A1 * | 2/2007 | Driver et al. | 416/229 R |
| 2007/0036653 A1 * | 2/2007 | Bak et al. | 416/98 |
| 2008/0206062 A1 * | 8/2008 | Sanz Pascual et al. | 416/226 |
| 2009/0274559 A1 * | 11/2009 | Petsche et al. | 416/223 R |
| 2009/0290982 A1 * | 11/2009 | Madsen et al. | 416/61 |
| 2009/0311106 A1 * | 12/2009 | Rohden | 416/241 A |

FOREIGN PATENT DOCUMENTS

| | | |
|---|---|---|
| BE | 00479299 | 12/1947 |
| DE | 919776 | 2/1963 |
| EP | 0 283 730 B1 | 11/1992 |
| EP | 1 524 431 A1 | 4/2005 |
| EP | 1 887 219 A1 | 2/2008 |
| GB | 2 100 866 A | 1/1983 |
| GB | 2 311 978 A | 10/1997 |
| WO | WO 01/46582 | 6/2001 |
| WO | WO 01/46582 A3 | 6/2001 |
| WO | WO 02/051730 A2 | 7/2002 |
| WO | WO 02/051730 A3 | 7/2002 |
| WO | WO 2007/071249 A1 | 6/2007 |
| WO | WO 2007/118581 | 10/2007 |
| WO | WO 2008/000330 A3 | 1/2008 |
| WO | WO 2008/052677 | 5/2008 |

* cited by examiner

*Primary Examiner* — Jenny L Wagner
*Assistant Examiner* — Mark Tornow
(74) *Attorney, Agent, or Firm* — Wood, Herron & Evans, LLP

(57) ABSTRACT

A wind turbine rotor blade extension portion having a plurality of segments, located adjacent one another in a span-wise sense. An interface between adjacent segments is configured to minimize disruption to fluid passing thereover and to inhibit transmission of longitudinal loads between segments. Each segment has a first surface and a second surface. The first surface is spaced from the second surface at a proximal region of the extension portion and the first surface is connected to the second surface at a distal region of the extension portion to thereby generate a fair surface for a rotor blade to which the extension portion is connected, in use.

23 Claims, 4 Drawing Sheets

SEGMENTED ROTOR BLADE EXTENSION PORTION

BACKGROUND OF THE INVENTION

1. Field of the Invention

The present invention relates to the field of rotor blades for wind turbine installations. In particular, it relates to means for extending a chord-wise dimension of a portion of said rotor blades.

2. Description of the Related Art

Wind turbine installations are continuously being developed to enable the installation to capture and subsequently convert an increasing amount of the energy represented by the wind into electricity. In particular, it is desirable to increase the surface area of the blade that is presented to the wind to enable a more efficient capture of said energy. However, in providing a rotor blade having an increased surface area, increased loading is experienced by the structure of the blade.

Blade design involves optimisation of a number of characteristics of the blade. This optimisation typically involves selection of the aerofoil section to be used and variation of the aerofoil section along the span-wise length of the blade, camber of the blade and twist of the blade along a span-wise length. A rotor blade is varied in geometry in the span-wise direction, as the speed of the blade through the air increases with distance from the rotor hub. Furthermore, as the distance from the rotor hub increases, the air becomes "cleaner", in other words, there is less interference from other bodies such as the rotor hub itself and other, adjacent, blades.

In order to achieve optimal design for the blade in a root region of the blade, i.e. a proximal end of the blade, it is desirable to extend the chord-wise dimension to compensate for slower tangential velocity in this region. However an increase in dimension of the blade can cause structural problems.

FIG. 1 shows one type of a conventional rotor blade 2 comprising a load bearing, spar member 4 extending substantially the length of the blade, to which is connected an outer surface 6 of the blade 2. This outer surface is, generally, smoothly configured to enable air (or other fluid) to pass over in a streamlined manner. Rotor blades experience significant structural loading in operation, not only due to the aerodynamic loads exerted thereon but also due to the magnitude and weight of the structure of the rotor blade itself. These loads are primarily transmitted to the spar member 4 and from there to a hub (not shown) of the wind turbine.

In operation, the rotor blades 2 of a wind turbine rotate through a substantially vertically orientated plane. Consequently, significant cyclic loading is experienced by each blade. In particular, fluctuating tensile and compressive loads are experienced along a foremost or "leading" edge 8 of the blade 2 and along a rearmost or "trailing" edge 10 of the blade 2. Hereinafter, these particular loads are referred to as "edge-wise loads". The edge-wise loads are most significant in a root region of the rotor blade 2, for example for the 30% of the blade nearest to a hub of the wind turbine (once installed).

Whilst the edge-wise loads are experienced by both the leading edge 8 and the trailing edge 10, the trailing edge is located further from the neutral axis of the rotor blade 2 and therefore higher strains are experienced at the trailing edge 10 of the rotor blade. Furthermore, by locally increasing the chord-wise dimension in a root region of the rotor blade 2 (as depicted in FIG. 1), the trailing edge 10 describes a convex profile when viewed in plan form. It follows that when edge-wise loads are experienced along this profile, the material bounded by the trailing edge 10 is also exposed to the increased, fluctuating strain. In particular, a difficult to resist chord-wise load is exerted on the material effectively compressing the trailing edge 10 tending to cause this material to buckle.

In some rotor blades the cross section varies from representing an aerofoil at a region of maximum chord dimension to becoming circular in cross section at a root of the rotor blade. Such a variation means that the curvature described by the trailing edge 10 (when viewed in plan form) is more extreme. As the curvature is more extreme, the fluctuating strains experienced by the material bounded by the trailing edge are correspondingly increased.

It is, therefore, desirable to provide a means for increasing the chord of the blade, in a localised manner to enhance the aerodynamic performance of the rotor blade, whilst minimising a corresponding increase in structural loading.

SUMMARY OF THE INVENTION

According to a first aspect, the present invention provides a wind turbine rotor blade extension portion comprising a plurality of segments, located adjacent one another in a span-wise sense, an interface between adjacent segments being configured to inhibit transmission of loads between the segments, wherein each segment comprises a first surface and a second surface, the first surface being spaced from the second surface at a proximal region of the extension portion and the first surface being connected to the second surface at a distal region of the extension portion to thereby generate an extended trailing portion of a rotor blade to which the extension portion is connected, in use.

By providing an extension portion to be appended to a rotor blade, the rotor blade itself is able to achieve an optimally large aerodynamic root chord whilst maintaining a substantially straight load path along which accumulated edge-wise loads from an outboard region of the blade can be transmitted. The rotor blade can, therefore, be optimally structurally configured. The extension portion only contributes to the overall structural loading of a rotor blade, to which it is attached in a cantilevered manner, through aerodynamic and gravitational loads generated from the extension portion itself. Furthermore, the extension portion comprises a plurality of segments having interfaces between respective adjacent segments that inhibit transmission of longitudinal loads along the extension portion. Since these interfaces are only lightly loaded, the extension portion can be readily dismantled and reassembled which enables simpler transportation of the rotor blade.

The first and second surfaces of each segment may comprise one or more of the group of a fibre reinforced plastics material, for example glass fibre reinforced plastic (GFRP), a thermoplastic material, wood and a laminate or otherwise composite material. Use of such materials, enable the extension portion to remain as light weight as possible and, therefore to contribute to the overall weight of the rotor blade as little as possible. In so doing, any further increases in edge-wise loading are minimised.

The first and second surfaces of each segment may be formed from a single, folded or appropriately formed piece of material, or the two surfaces may be bonded together such that a fixed relative position between the two surfaces is achieved. In such a configuration, any movement between the surfaces occurs by virtue of the flexibility of the material from which the surfaces are formed. Alternatively, the two surfaces may be joined to one another using a hinged joint, thus permitting relative rotation between the two surfaces.

Lateral edges (i.e. those extending in a substantially chord-wise direction) of adjacent segments may comprise cooperating protruding sections that are configured to slideably interconnect with one another to permit longitudinal relative movement between the adjacent segments. Such a configuration inhibits transmission of longitudinal loads between the segments whilst presenting a convoluted path for flow of fluid between the two sections (in a through thickness direction) thus inhibiting ingress or egress of fluid between adjacent segments. Sealing means may be provided between adjacent segments to further inhibit leakage. In particular, a brush seal or a lip seal may be provided between the cooperating, protruding sections of adjacent segments. Alternatively, a sealing member of the sealing means may be formed from a material having greater flexibility than the material of the segments, said sealing member comprising cooperating protruding sections to directly interface with corresponding surfaces of adjacent segments such that the sealing member lies in the plane of the respective surface once installed. The sealing means may comprise an elastomeric material.

Alternatively, lateral edges of adjacent segments may comprise a planar, or substantially planar, profile and the segments may be marginally spaced from one another. A sealing member, such as an elastomeric seal, an inflatable seal or a labyrinth seal, may be provided between the adjacent segments.

According to a second aspect, the present invention provides a wind turbine rotor blade, comprising:
  a structurally coherent, blade portion comprising:
  a leading portion configured to receive fluid incident on the rotor blade; and
  a trailing portion, located downstream of the leading portion and configured to smoothly convey fluid passing thereover from the leading portion, wherein a root region of the blade portion is configured to be connectable to a hub of a wind turbine and the blade portion is configured to smoothly transfer loads experienced thereby to the root region of the blade portion for transfer to the hub; and
  an extension portion, as previously described, wherein the extension portion is configured to be appendable to the trailing portion of the blade portion, e.g. in a root region thereof.

An interface between the extension portion and the trailing portion may be configured to permit a longitudinal degree of freedom. In so doing, transmission of edge-wise loads from a rearmost edge of the trailing portion to the extension portion can be minimised. The interface may comprise a longitudinally extending protrusion, formed on one of the extension portion and the trailing portion and a cooperating, longitudinally extending retaining recess, formed on the other of the extension portion and the trailing portion. Once assembled, the protrusion (or key) is located in the retaining recess (or key way) such that whilst the extension portion and the trailing portion are securely connected to one another, a degree of relative longitudinal movement there between, say in the range of 1 mm to 10 mm, is enabled.

Alternatively, the interface may comprise a longitudinally extending pad, fixedly bonded to each of the extension portion and the trailing portion, wherein the material from which the pad is formed enables a degree of relative movement, say in the range of 1 mm to 10 mm, between the extension portion and the blade portion.

The extension portion may be connected to the trailing portion using a bolt or similar fixing mechanism configured to pass through a hole formed in one portion and be retained relative to the other portion, wherein the hole is elongate in the span-wise direction, thus enabling a degree of relative movement, say in the range of 0.1 mm to 2 mm, between the extension portion and the blade portion.

The blade portion may comprise a truncated profile whereby the root region of the trailing portion is configured to receive the extension portion. In this way, the blade portion can be designed to have a reduced weight and a substantially straightened rearmost edge.

Alternatively, the blade portion may be a full wind turbine rotor blade. The addition of an extension portion to such a rotor blade enables an increase in local chord length to be achieved.

According to a third aspect, the present invention provides a wind turbine rotor blade comprising:
  a structurally coherent blade portion comprising:
    a root portion configured to be connectable to a hub of a wind turbine;
    a tip portion located remotely from the root portion; and
    a longitudinal structural member extending between the root portion and the tip portion, wherein the blade portion is configured to provide a continuous load bearing path along a rearmost surface thereof, from tip to root, along which longitudinal loads are transmitted, in use; and
  an extension portion, appendable to the rearmost surface in the root portion, wherein the extension portion is configured to provide a streamlined extension surface to the blade portion whilst inhibiting transmission of loads therewithin and from the blade portion.

By providing a rotor blade, having a separate blade portion and extension portion, many advantages can be achieved:
  Structural loads acting along a trailing edge of the rotor blade, in use, are shifted closer to the neutral axis of the rotor blade, thus reducing the lever arm over which such forces act.
  Transportation of the rotor blade becomes easier as the extension portion and the blade portion can be separately transported to an installation site. Costs of transportation are generally reduced if the maximum width of the rotor blade is reduced.
  The design of the rotor blade can be optimised for particular site locations by changing only the extension portion; this enhances the flexibility of a given product.
  The particularly light weight configuration of the extension portion reduces the mass of the rotor blade, further reducing costs.
  It also follows that lower gravitational loads are experienced at the hub of a wind turbine installation to which the rotor blade may be attached in use.
  The blade portion of the rotor blade is substantially narrower than a conventional rotor blade enabling the main shell mould to be correspondingly narrower. Consequently, the mould takes up less room and in particular smaller ovens are required for curing.
  Damaged extension portions can readily be replaced.

According to a fourth aspect, the present invention provides a wind turbine installation comprising a rotor hub supported by a tower, wherein one or more of the aforementioned rotor blades are appended to the rotor hub.

By "structurally coherent" we mean that the associated component, here the primary portion of the rotor blade, provides an effectively unitary member which efficiently transmits structural loads such that the loads become distributed loads thus avoiding development of localised stress concentrators or other localised loading phenomena.

By "streamlined surface" we mean a smoothly varying, continuous surface over which the associated fluid flow passes smoothly with little or no disruption in the streamlines of said fluid flow.

By "continuous load bearing path" we mean that the rearmost surface along which the load bearing path is located does not comprise any discontinuities (or "notches") that would result in generation of stress concentrators or other localised loading phenomena.

BRIEF DESCRIPTION OF THE DRAWINGS

In the drawings.

The present invention will now be described in more detail, by way of example only, with reference to the accompanying drawings in which.

DETAILED DESCRIPTION OF THE PRESENTLY PREFERRED EMBODIMENTS

Figure 1:
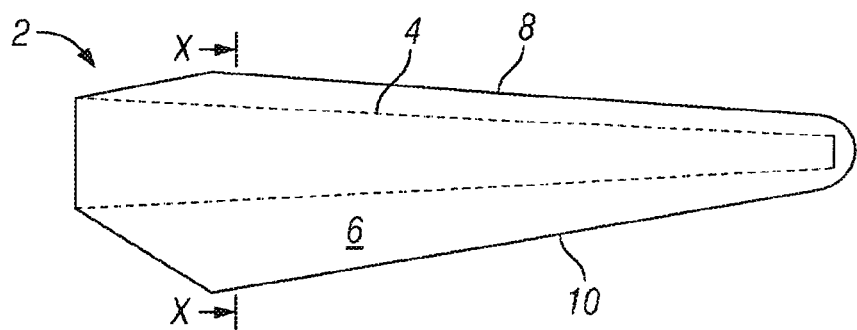
FIG. 1 represents a prior art rotor blade having a span-wise variation in chord length.
Figure 2:
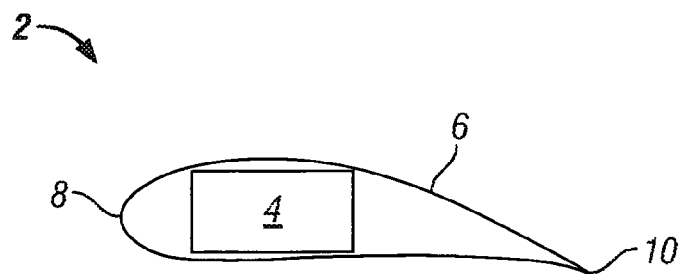
FIG. 2 represents a cross section (on X-X) of the rotor blade of FIG. 1.
Figure 3:
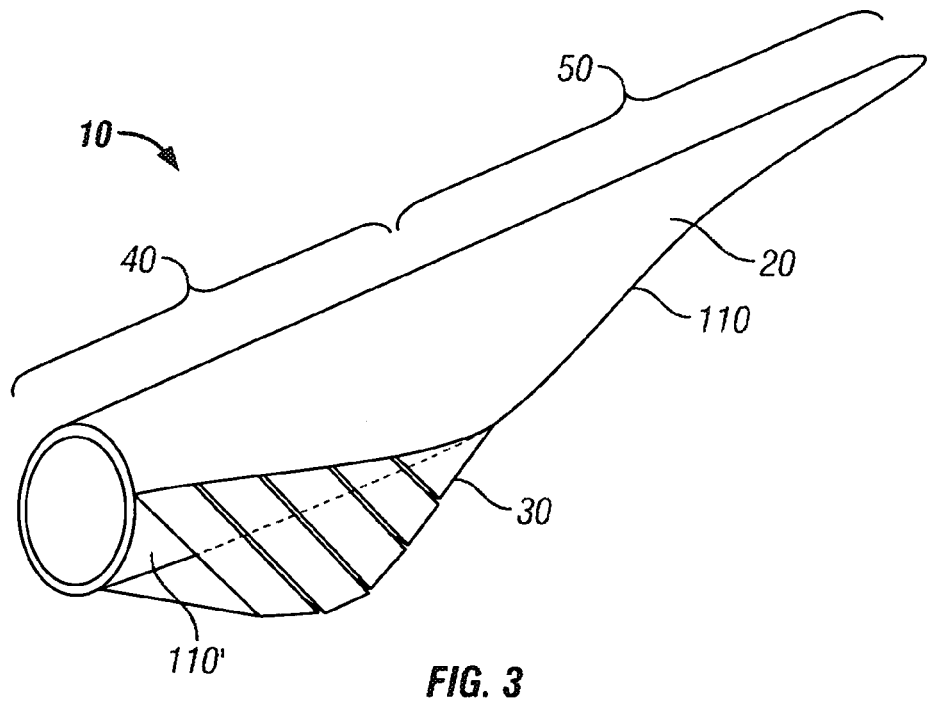
FIG. 3 illustrates a schematic of a rotor blade having an extension portion appended thereto.

FIG. 3 illustrates a rotor blade 10 comprising a blade portion 20 and an extension portion 30. A proximal or "root" end 40 of the blade portion 20 is configured to be connected to a rotor hub of a wind turbine installation (not shown), while the distal end 50 of the blade portion 20 extends from the root end 40, and is supported thereby. This distal end 50 represents a "tip" of the blade 10. The length of a rotor blade 10 may be in the range of 20 to 150 meters in length but is typically in the range of 20 to 70 m. An extension portion 30 is appended to a rearmost region of the root end 40. In the illustrated embodiment the extension portion 30 is appended at extreme proximal location, adjacent to where the rotor blade is connected to the rotor hub in use, however the extension portion 30 may be spaced from this extreme proximal location towards the tip of the blade.

Figure 4:
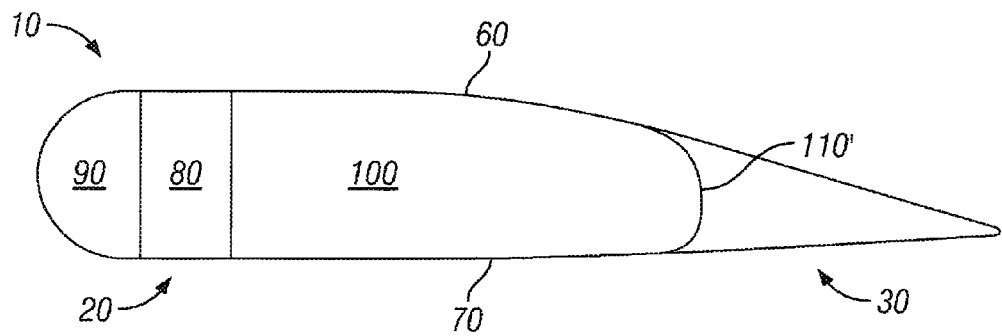
FIG. 4 illustrates a schematic cross section of a rotor blade.

A schematic representing a cross section of the root end 40 of the rotor blade 10 is shown in FIG. 4. An upper surface (as depicted in the figure) represents a suction side 60 of the blade portion 20 and a lower surface (as depicted in the figure) represents a pressure side 70 of the blade portion 20. A representative structure of the blade portion 20 is also indicated. A load bearing spar member 80 is shown, having a leading portion 90 located upstream thereof and a trailing portion 100 located downstream thereof.

The blade portion 20 of the rotor blade 10 may be made up from a plurality of sub-components. However, the sub-components are connected to one another in such a way that structural loading is readily transmitted between one sub-component and any sub-components adjacent thereto. In this way, a unitary member is effectively provided, such that structural coherence is achieved.

The blade portion 20 of rotor blade 10 may represent an existing blade or, alternatively, it may represent a specifically designed blade. FIG. 4 represents the latter example, a trailing portion 100 of the specifically designed blade is truncated at the root end 40, thus presenting a rearmost surface 110' to which the extension portion 30 may be appended.

The blade portion 20 of rotor blade 10 may be manufactured by separately forming a longitudinally extending, structural spar 80 together with two half-shells. A first half-shell provides the suction surface 60 of the blade 10 and a second half-shell provides the pressure surface 70 of the blade 10. The spar and the two half-shell components are assembled and bonded together to form a cohesive unit. In such an example, the primary loading experienced by the rotor blade 10 is borne by the spar 80.

Figure 5:
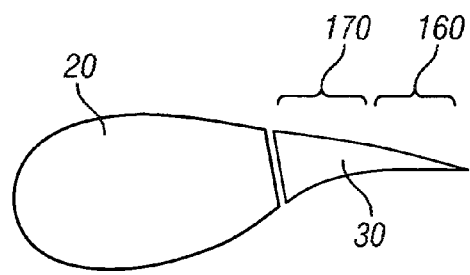
FIG. 5 illustrates a schematic cross section of another rotor blade.

In an alternative example, each half-shell component is, itself, reinforced and the separate spar of the previous example is replaced by longitudinal webs that are bonded to each respective half-shell as the blade portion 20 of the rotor blade 10 is assembled. Alternatively, the webs may be omitted, in which case, the loading is carried by the reinforced shell as illustrated in FIG. 5. The spar is then, effectively, integral with the rotor blade 10 and the cohesive unit bears any loading in a more distributed fashion.

In normal use, once assembled in a wind turbine installation, the root end 40 of the rotor blade 10 travels slower than the tip end 50 and, consequently, the fluid travelling thereover is correspondingly slower. In order to achieve the preferred aerodynamic loading pattern on the rotor blade 10, it is desirable to increase the chord length of the blade 10 at the root end 40. Accordingly, as illustrated in FIG. 3, an extension portion 30 is appended to a rear-most surface 110', extending from a rear-most edge 110 of the trailing portion 100 of the blade portion 20, at the root end 40 thereof. The extension portion 30 provides a continuation of the suction surface 60 of the blade portion 20 of the rotor blade 10 and the corresponding pressure surface 70 of the blade portion 20 of the rotor blade 10. The continuation of these surfaces 60, 70 allows the flow pattern, established on the main portion 20 of the rotor blade 10, to be extended.

Figure 6:
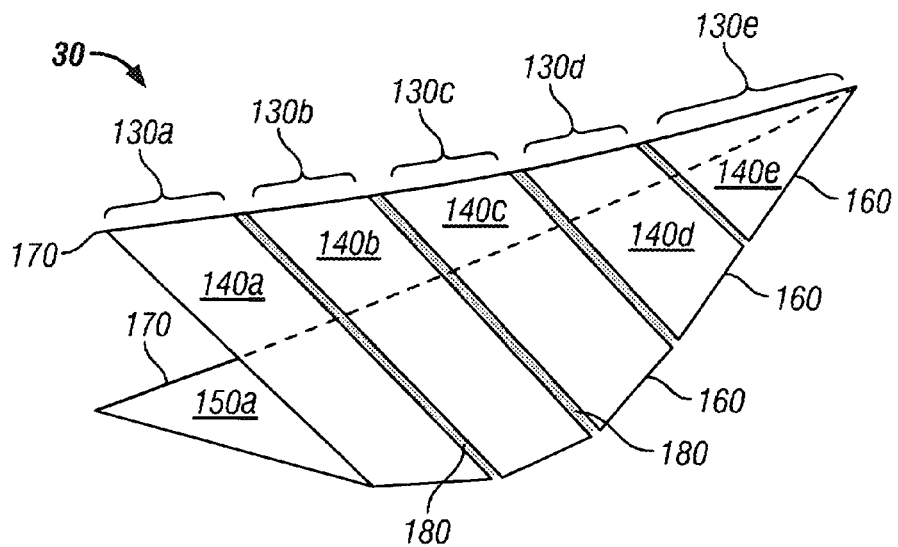
FIG. 6 illustrates a rotor blade extension portion.

The extension portion 30 is illustrated in more detail in FIG. 6. The extension portion 30 comprises a number of segments 130a, 130b, 130c, 130d, 130e, in this example, five segments are provided however, more or fewer segments could readily be used.

In this embodiment, adjacent segments are marginally spaced from one another in a span-wise sense as illustrated. Each segment 130a-e comprises two surfaces, a first surface 140a-e and a second surface 150a-e. For any particular segment, say 130a the first surface 140a is connected to the second surface 150a in a distal region 160 of the extension portion 30. The surfaces 140a, 150a are separated from one another in a proximal region 170 of the extension portion 30.

The surfaces are formed from a light weight material in order to minimise the contribution of the extension portion 30 to the overall weight of the rotor blade 10 and hence to edge-wise loads that are experienced thereby. Example materials include, but are not limited to, fibre reinforced polymers (e.g. a glass fibre reinforced plastics material), thermoplastic materials, wood and laminate materials.

The connection between surfaces 140a, 150a in a distal region 160 may be a hinged connection to enable the two surfaces to move or flex relative to one another. Alternatively the connection may be a bonded connection or the two surfaces may be formed from a single folded or otherwise formed sheet material such that relative rotation between the two surfaces is inhibited.

As shown, the extension portion 30 is connected to and supported by the blade portion 20 in a cantilevered configuration. The connection of each respective surface 140*a*, 150*a* to the rearmost surface 110' of the trailing portion 100 is preferably a connection that permits some longitudinal degree of freedom.

Figure 7A:
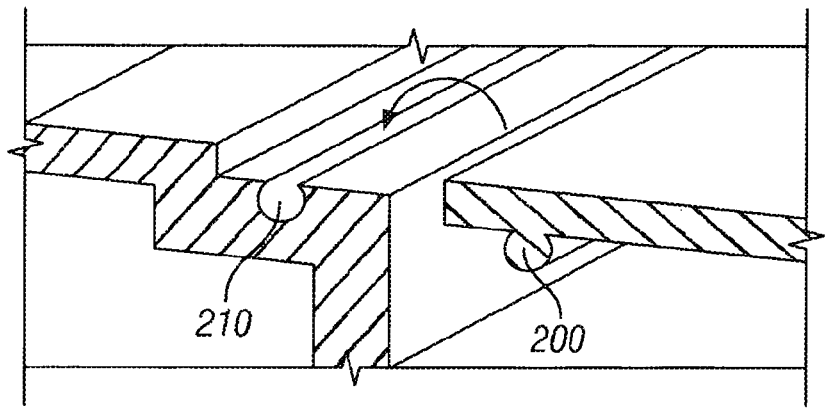
FIG. 7 illustrates detail of connection means for an extension portion.
Figure 7B:
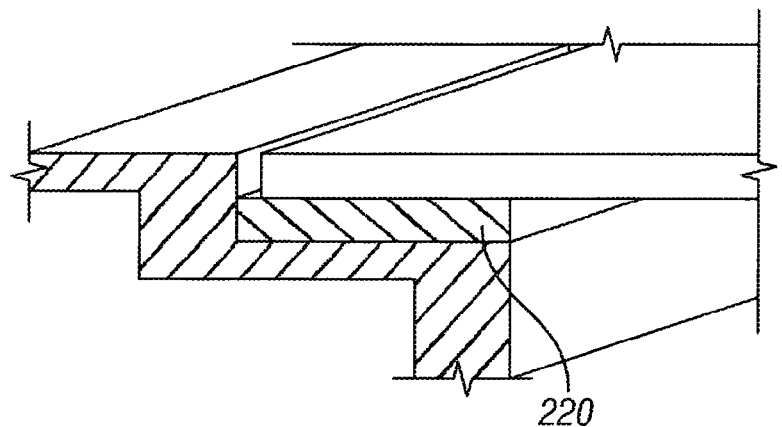
Figure 7C:
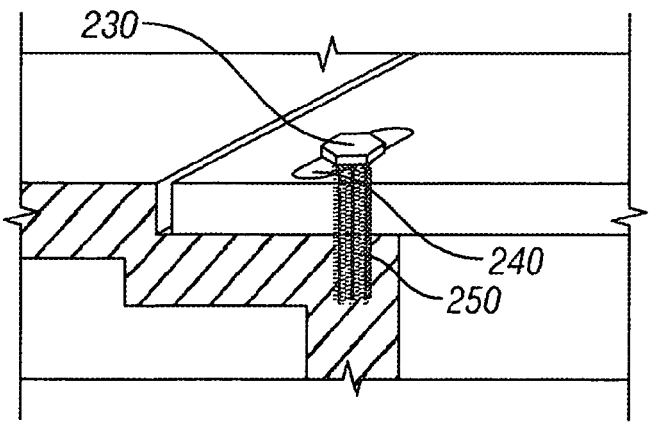

FIGS. 7*a*, 7*b* and 7*c* illustrate some examples of connection means, each displaying some longitudinal degree of freedom that may be used between the blade portion 20 and the extension portion 30. In a connection means of the type shown in FIG. 7*a*, a complementary key and associated key way are formed on respective cooperating surfaces of the blade portion 20 and extension portion 30. In this particular example, a substantially cylindrical key or protruding member 200 is formed on an underside of the first surface (e.g. 140*a*) and a corresponding, substantially circular sectioned, recess 210 has been formed on a cooperating surface of the blade portion 20. Upon assembly, the protruding member is slid into the recess and the first surface 140*a* retains some freedom to slide (longitudinally) with respect to the blade portion 20.

In another embodiment, as illustrated in FIG. 7*b*, an elastomeric or similarly compliant, pad 220 is provided between cooperating surfaces of the blade portion 20 and the first or second surface 140*a*, 150*a*. The pad 220 is bonded to each of the cooperating surfaces and is made from a material that has a greater flexibility than the material of either the blade portion 20 or the surface 140*a*, 150*a*. This flexibility permits limited relative movement between the cooperating surfaces, say in the range of 1 mm to 10 mm.

In a further embodiment, as illustrated in FIG. 7*c*, the connection means comprises a bolt 230 or similar fixing arrangement requiring a shaft to be inserted through a hole formed in one or each surface. In particular, in this example, an elongate guide hole 240 is provided in the first surface 140*a* of the extension portion 30 and a receiving hole 250 is provided in the cooperating surface of the blade portion 20. Upon assembly, the cooperating surfaces are aligned and the bolt 230 is inserted through the guide hole 240 and retained (by a captive nut or some such means) in the receiving hole 250. Clearance is maintained such that longitudinal movement of the bolt 230 within the elongate guide hole 240 can be achieved. Thus a degree of longitudinal freedom of movement is achieved between the extension portion 30 and the blade portion 20. Relative longitudinal movement in the range of 0.1 mm to 10 mm may be effected.

In order to maintain a streamlined or "fair" fluid flow over the rotor blade 10, it is desirable to minimise ingress or egress of fluid flow between the segments 130*a-e*. However, it is also desirable to maintain the freedom of movement in the span-wise direction so that longitudinal loads, particularly the edge-wise loads, are not transmitted between the segments. Consequently, sealing means are provided between adjacent segments. Example sealing means are illustrated in FIGS. 8*a* to 8*e*.

Figure 8A:
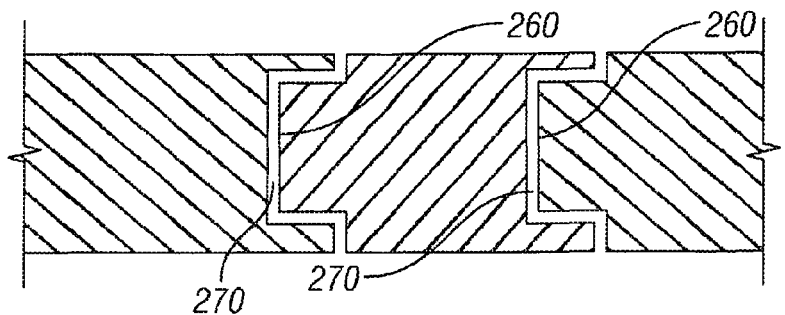
FIG. 8 illustrates detail of example interfaces between segments of the extension portion.
Figure 8B:
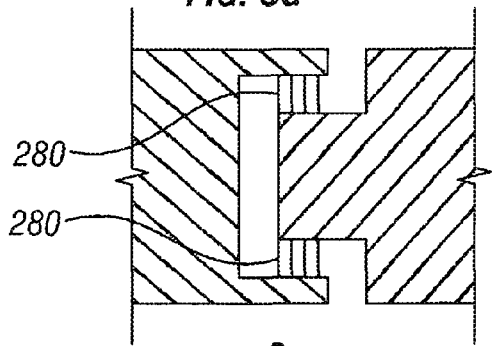

In FIG. 8*a*, lateral edges of adjacent segments are provided with cooperating profiles. Protrusions 260 formed on one segment, say 130*c*, are configured to mate with recesses 270 formed on the adjacent segment, say 130*b*. Once the adjacent segments 130*b*, 130*c* are assembled, an overlap in material is provided which inhibits fluid flow through the thickness of the respective surface. However, a clearance is provided as illustrated to allow a degree of freedom, say 0.1 mm to 2 mm in the span-wise sense to be retained between segments. FIG. 8*b*, illustrates a similar configuration to that shown in FIG. 8*a*, wherein additional sealing members are introduced into the clearance. Preferably, the sealing members are brush seals 280 as illustrated or lip seals, either of which would permit some movement and, therefore, retain the span-wise freedom between the segments.

Figure 8C:
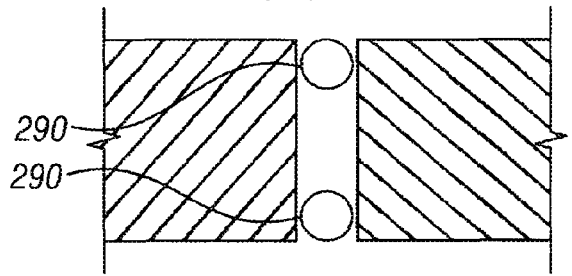
Figure 8D:
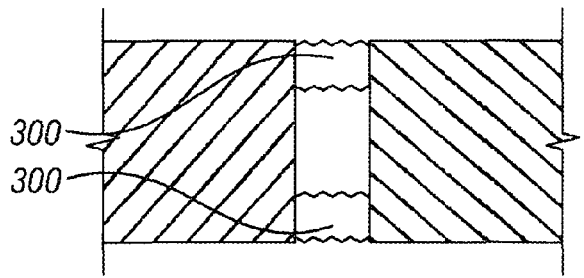
Figure 8E:
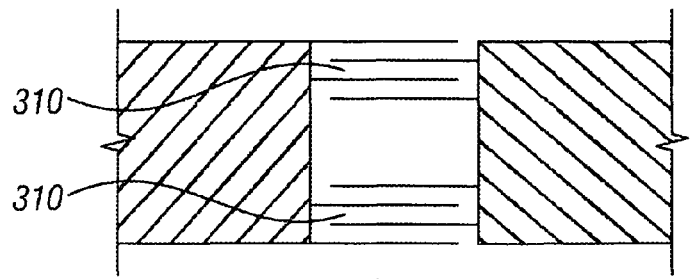

In FIGS. 8*c* to 8*e* the lateral edges of adjacent segments need not be provided with mating profiles. As illustrated, the cooperating profiles of adjacent segments are substantially planar. In FIG. 8*c*, two elastomeric sealing members 290 are provided between cooperating surfaces, say 140*b*, 140*c*, of adjacent segments, 130*b*, 130*c*. The sealing members 290 are bonded to each surface 140*b*, 140*c*. Adjacent segments 130*b*, 130*c* can, therefore, experience some relative movement therebetween and the compliance of the elastomeric sealing members 290 accommodates the movement whilst retaining a seal between the segments to prevent leakage. Inflatable sealing members 300 may be provided in place of the elastomeric sealing members 290, as illustrated in FIG. 8*d* or, alternatively, labyrinth sealing members 310 may be provided as illustrated in FIG. 8*e*.

In operation, the rotor blade 10 is exposed to a moving air stream. The interaction between the air stream and the rotor blade 10 causes loads to be exerted on the blade and the blade is consequently displaced. As the rotor blade 10 rotates around the hub, the loads experienced thereby constantly change as the aspect of the blade 10 differs depending on its location at any point in time. In particular, edge-wise loads are induced in each lateral edge of the blade portion, these edge-wise loads are generated primarily by the action of the weight of the rotor blade 10.

As fluid passes over the rotor blade 10 primary load paths are retained within the blade portion 20 of the rotor blade 10. Introduction of the extension portion 30 enables the blade portion 20 to retain a more constant chord, whilst the rotor blade 10 achieves a larger chord locally, thus optimising aerodynamic performance thereof. Consequently, the rearmost edge 110 of the blade portion 20 is significantly straighter than is the case when an extension portion 30 is not used. By straightening the rearmost edge, chord-wise loading caused by directing loads around an extreme trailing edge of a rotor blade 10 is reduced and structural loading and design of the rotor blade 10 is, thus, enhanced. In particular, costs associated with the rotor blade 10 may, therefore, be reduced.

Introduction of the extension portion 30 at a rearmost portion of the blade portion 20 serves to enhance the fluid flow over the rotor blade 10 at the root end 40 such that a optimum amount of lift, i.e. efficient loading of the rotor blade 10, is achieved in this root region 40. Aerodynamic loads exerted on the extension portion 30 are transmitted to the blade portion 20 through the connection means, but transmission of loads to the extension portion 30 are inhibited.

Indeed, loading of the extension portion 30 is notably light when transmission of the edge-wise loads is inhibited-(if not prevented) from the surface 110', 110 of the blade portion 20 to the extension portion 30. Consequently, significant increases in chord-wise length can be introduced at the root end 40 of the rotor blade 10 without incurring significant loading in this area and without requiring the remainder of the rotor blade 10 to be significantly reinforced to accommodate additional loading.

The invention has been described with reference to specific examples and embodiments. However, it should be understood that the invention is not limited to the particular examples disclosed herein but may be designed and altered within the scope of the invention in accordance with the claims.

What is claimed is:

1. A wind turbine rotor blade, comprising:
a structurally coherent blade portion, the blade portion comprising:
a leading portion configured to receive fluid incident on the rotor blade; and a trailing portion located downstream of the leading portion and configured to smoothly convey fluid passing thereover from the leading portion, wherein a root region of the blade portion is configured to be connectable to a hub of a wind turbine and the blade portion is configured to smoothly transfer loads experienced thereby to the root region of the blade portion for transfer to the hub; and an extension portion appended to an outer surface of the trailing portion, the extension portion comprising a plurality of segments located adjacent one another in a span-wise sense, an interface between adjacent segments being configured to inhibit transmission of loads between the segments, wherein each segment comprises a first surface and a second surface, the first surface being spaced from the second surface at a proximal region of the extension portion and the first surface being connected to the second surface at a distal region of the extension portion.

2. The rotor blade according to claim 1, wherein each segment comprises one of the group of a fibre reinforced plastic material, a thermoplastic material, wood and a laminate material.

3. The rotor blade according to claim 1, wherein the first and second surfaces of each segment are formed from a single, folded piece of material.

4. The rotor blade according to claim 1, wherein the first and second surfaces of each segment are bonded to one another such that a fixed relative position between the two surfaces is achieved.

5. The rotor blade according to claim 1, wherein the first and second surfaces of each segment are joined to one another using a hinged joint, such that relative rotation between the two surfaces is enabled.

6. The rotor blade according to claim 1, wherein lateral edges of adjacent segments, extending in a substantially chord-wise direction, comprise cooperating, protruding sections configured to slideably interconnect with one another to permit longitudinal relative movement between the adjacent segments.

7. The rotor blade according to claim 6, comprising sealing means located between adjacent segments to inhibit leakage of fluid therethrough.

8. The rotor blade according to claim 7, wherein the sealing means comprises one of the group of a brush seal and a lip seal, wherein said seal is located between the cooperating, protruding sections of adjacent segments.

9. The rotor blade according to claim 7, wherein a sealing member of the sealing means comprises an elastomeric material.

10. The rotor blade according to claim 1, wherein lateral edges of adjacent segments, extending in a substantially chord-wise direction, comprise a planar, or substantially planar, profile and the segments are spaced from one another.

11. The rotor blade according to claim 10, comprising sealing means located between adjacent segments, to inhibit leakage of fluid therethrough.

12. The rotor blade according to claim 11, wherein the sealing member is one of the group of an elastomeric seal, an inflatable seal and a labyrinth seal.

13. The rotor blade according to claim 1, wherein the extension portion is appended to a root region of the trailing portion.

14. The rotor blade according to claim 1, wherein an interface between the extension portion and the trailing portion comprises a longitudinally extending protrusion, formed on one of the extension portion and the trailing portion and a cooperating, longitudinally extending retaining recess, formed on the other of the extension portion and the trailing portion.

15. The rotor blade according to claim 1, wherein an interface between the extension portion and the trailing portion comprises a longitudinally extending pad, connected to each of the extension portion and the trailing portion, wherein the pad comprises a material having a greater compliance than respective materials of the extension portion and the trailing portion.

16. The rotor blade according to claim 1, wherein an interface between the extension portion and the trailing portion comprises a bolt, or similar fixing mechanism, configured to pass through a guide hole formed in one portion and be retained relative to the other portion, wherein the guide hole is elongated in the span-wise direction.

17. The rotor blade according to claim 1, wherein the blade portion comprises a truncated profile, whereby the root region of the trailing portion is configured to receive the extension portion.

18. The rotor blade according to claim 1, wherein the blade portion is a wind turbine rotor blade.

19. A wind turbine rotor blade, comprising:
a structurally coherent blade portion, the blade portion comprising:
a root portion configured to be connectable to a hub of a wind turbine;
a tip portion located remotely from the root portion; and
a longitudinal structural member extending between the root portion and the tip portion, wherein the blade portion is configured to provide a continuous load bearing path along a rearmost surface thereof, from tip to root, along which longitudinal loads are transmitted, in use; and
an extension portion appended to the outer, rearmost surface of the root portion, wherein the extension portion is configured to provide a streamlined extension surface to the blade portion whilst inhibiting span-wise transmission of loads therewithin and from the blade portion.

20. A wind turbine installation comprising a rotor hub supported by a tower, comprising a rotor blade according to claim 1, wherein the, or each rotor blade is appended to the rotor hub.

21. A wind turbine installation comprising a rotor hub supported by a tower, comprising a rotor blade according to claim 19, wherein the, or each rotor blade is appended to the rotor hub.

22. A wind turbine rotor blade, comprising:
a structurally coherent blade portion, the blade portion comprising:
a leading portion configured to receive fluid incident on the rotor blade; and
a trailing portion located downstream of the leading portion and configured to smoothly convey fluid passing thereover from the leading portion,
wherein a root region of the blade portion is configured to be connectable to a hub of a wind turbine and the blade portion is configured to smoothly transfer loads experienced thereby to the root region of the blade portion for transfer to the hub; and
an extension portion comprising a plurality of segments located adjacent one another in a span-wise sense, an interface between adjacent segments being configured to inhibit transmission of loads between the segments, wherein each segment comprises a first surface and a second surface, the first surface being spaced from the second surface at a proximal region of the extension portion and the first surface being connected to the second surface at a distal region of the extension portion, and wherein the first and second surfaces engage an outer surface of the trailing portion at the proximal region of the extension portion.

23. A wind turbine rotor blade, comprising:

a structurally coherent blade portion, the blade portion comprising:
- a leading portion configured to receive fluid incident on the rotor blade; and
- a trailing portion located downstream of the leading portion and configured to smoothly convey fluid passing thereover from the leading portion,
- wherein a root region of the blade portion is configured to be connectable to a hub of a wind turbine and the blade portion is configured to smoothly transfer loads experienced thereby to the root region of the blade portion for transfer to the hub; and an extension portion comprising a plurality of segments located adjacent one another in a span-wise sense, an interface between adjacent segments being configured to inhibit transmission of loads between the segments, wherein each segment comprises a first surface and a second surface, the first surface being spaced from the second surface at a proximal region of the extension portion and the first surface being connected to the second surface at a distal region of the extension portion, and wherein an outer surface of the trailing portion underlies the extension portion for a full span-wise length of the extension portion.

\* \* \* \* \*